X0009648
V. Brown.
Canal Gate Signal.
Patented May 14, 1836.
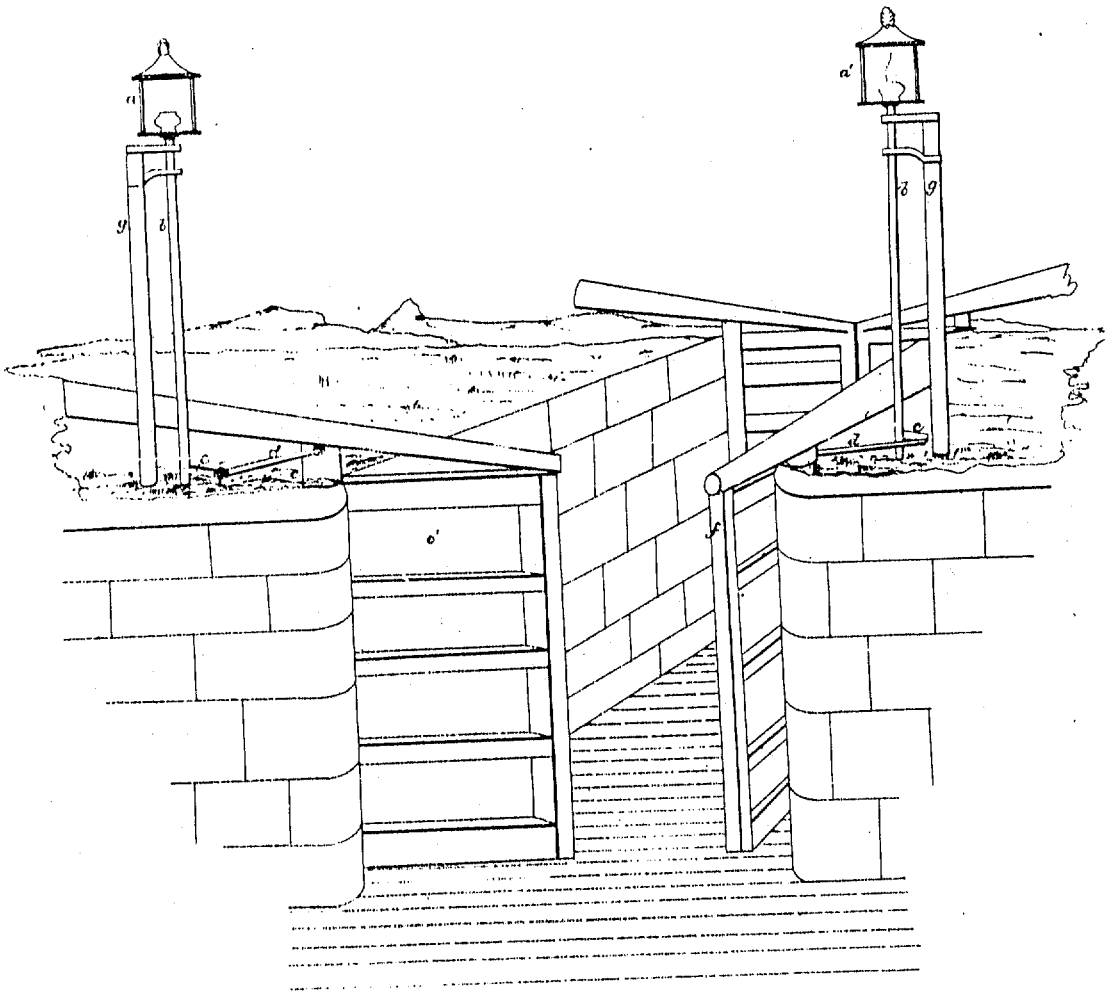
THE ORAPHIC CO. PHOTO-LITH. 39 & 41 PARK PLACE, N.Y.

May 14, 1836

9648X Valentine Brown.

Letters Patent.

The Schedule referred to in these Letters Patent and making part of the same, containing a description in the words of the said Valentine Brown himself of his improvement in the Canal Lock Gate.

---

To all to whom these presents shall come.

Be it Known that I Valentine Brown of the County of Saratoga and State of New York, have invented a new and useful improvement in the use of friction rollers in the vertical slide or lift gate of Canal locks, and that the following is a full and exact description of the same: My improvement consists in the use of vertical rows of friction rollers parallel to each other and lying horizontally to ease the motion of the vertical slide gate in the main gate of a Lock. These rollers are placed on or imbedded in the inner side of the uprights of the main gates —

The rollers have journals which work in either wood or metal seats. The rollers and rests may be of any material, but, that which will not readily decay or rust will be prefered. It will readily be perceived that when the water presses the gate against the rollers instead of the bare timbers, the gate will slide up or down much more freely than without the application of the rollers, by which much labour and power will be saved.

Witnesses
Matthias S. Bunn
H. Baldwin

Valentine Brown

2391